(12) United States Patent
Chen (10) Patent No.: US 9,727,091 B2
(45) Date of Patent: Aug. 8, 2017

(54) ELECTRONIC DEVICE

(71) Applicants: BEIJING LENOVO SOFTWARE LTD., Beijing (CN); LENOVO (BEIJING) LIMITED, Beijing (CN)

(72) Inventor: Xing Chen, Beijing (CN)

(73) Assignees: LENOVO (BEIJING) LIMITED, Beijing (CN); BEIJING LENOVO SOFTWARE LTD., Beijing (CN)

( * ) Notice: Subject to any disclaimer, the term of this patent is extended or adjusted under 35 U.S.C. 154(b) by 0 days.

(21) Appl. No.: 14/209,145

(22) Filed: Mar. 13, 2014

(65) Prior Publication Data

US 2014/0293537 A1    Oct. 2, 2014

(30) Foreign Application Priority Data

Mar. 29, 2013   (CN) .......................... 2013 1 0109030

(51) Int. Cl.
*G06F 1/16*    (2006.01)

(52) U.S. Cl.
CPC .......... *G06F 1/1681* (2013.01); *G06F 1/1616* (2013.01); *G06F 1/1643* (2013.01); *G06F 1/1679* (2013.01)

(58) Field of Classification Search
CPC .... G06F 1/1616; G06F 1/1618; G06F 1/1681; G06F 1/166
USPC .................. 361/679.17, 679.28, 679.29, 361/679.41–679.43
See application file for complete search history.

(56) References Cited

U.S. PATENT DOCUMENTS

| | | | | |
|---|---|---|---|---|
| 6,036,287 | A * | 3/2000 | Kim ....................... | G06F 1/1616 108/27 |
| 8,289,688 | B2 * | 10/2012 | Behar ..................... | G06F 1/162 361/679.27 |
| 9,003,315 | B2 * | 4/2015 | Behar ..................... | G06F 1/162 715/744 |
| 2004/0001306 | A1 * | 1/2004 | Oakley ........................ | 361/683 |
| 2004/0155861 | A1 * | 8/2004 | Jackson, III .......... | G06F 1/1632 345/156 |
| 2005/0265130 | A1 * | 12/2005 | Suzuki ................... | F16M 13/00 368/276 |
| 2007/0041151 | A1 * | 2/2007 | Park ....................... | G06F 1/1616 361/679.04 |

(Continued)

FOREIGN PATENT DOCUMENTS

TW        M439836 U1    10/2012

*Primary Examiner* — Hoa C Nguyen
*Assistant Examiner* — Christopher L Augustin
(74) *Attorney, Agent, or Firm* — Sills Cummis & Gross P.C.

(57) ABSTRACT

This application discloses an electronic device. The electronic device comprises a first body including an A surface and a B surface that are opposite to each other; a second body including a C surface and a D surface that are opposite to each other; and a connecting piece by means of which the first and the second bodies are connected and the first body is rotatable relative to the second body. A further rotation of the first body around the connecting piece is prevented by the second body when the first body is rotated relative to the second body, by means of the connecting piece, such that the electronic device is at a first posture that is a relative positional posture where value of an angle between the A surface and the D surface is a first angle value within the range of greater than 0° but less than or equal to 90°.

6 Claims, 5 Drawing Sheets (56) References Cited

U.S. PATENT DOCUMENTS

| | | | |
|---|---|---|---|
| 2011/0043979 A1* | 2/2011 | Saito | G06F 1/1616 |
| | | | 361/679.01 |
| 2011/0128216 A1* | 6/2011 | Renwick | G06F 1/1618 |
| | | | 345/156 |
| 2012/0062483 A1* | 3/2012 | Ciesla | G06F 1/1626 |
| | | | 345/173 |
| 2013/0155591 A1* | 6/2013 | Yamaguchi | G06F 1/1626 |
| | | | 361/679.3 |
| 2013/0163187 A1* | 6/2013 | Wang et al. | 361/679.41 |
| 2013/0169564 A1* | 7/2013 | Sano | G06F 1/1647 |
| | | | 345/173 |
| 2013/0250492 A1* | 9/2013 | Wong | G06F 1/1641 |
| | | | 361/679.01 |

\* cited by examiner

ELECTRONIC DEVICE

CROSS REFERENCE TO RELATED APPLICATIONS

This application claims priority to Chinese National Application No. 201310109030.1 filed on Mar. 29, 2013. The entire contents of each and every foregoing application are incorporated herein by reference.

BACKGROUND OF THE INVENTION

Field of the Invention

The present invention generally relates to a field of electronic technology, and in particular, to an electronic device.

Description of the Related Art

As people pay more attention to experience on interaction with the electronic device, and a conventional screen with only display function has been displaced by a touch display device. For example, a conventional notebook screen with only display function has been displaced by a touch display screen, and user performs a touch operation on such display screen.

During the implementation of the technical solution according to an embodiment of the present invention, the inventor has found that there are the following technical problems existing in prior art.

Figure 1:
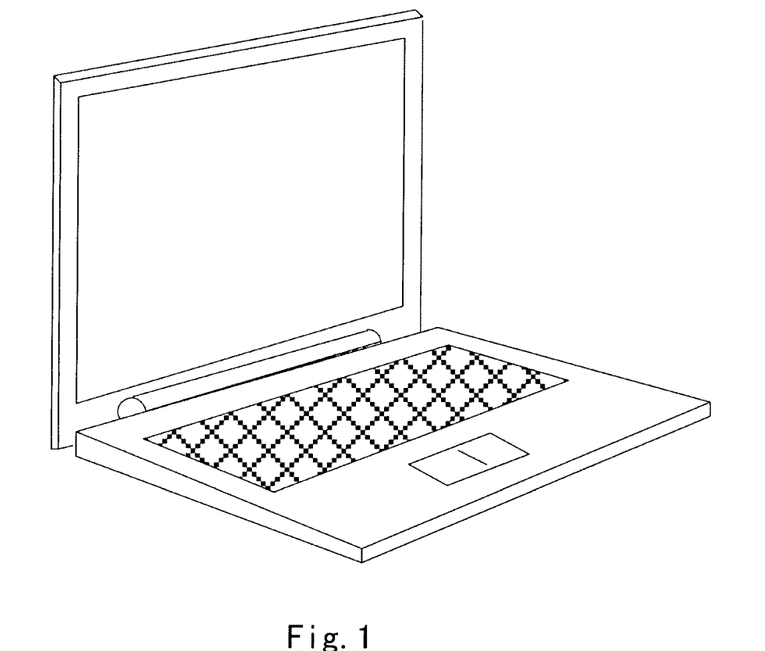
FIG. 1 is a structurally schematic view of an electronic device in a conventional notebook configuration in prior art.

In prior art, a notebook with conventional configuration is shown in FIG. 1, there has been found a technical problem during a touch operation on the display screen, that is, angular position of the display screen in this electronic device changes along with the touch operation as torsion of the shaft in the notebook cannot bear against force applied by the user during the click operation, such that user cannot carry out an accurate touch operation thereby resulting in a poor user's operation experience.

Figure 2:
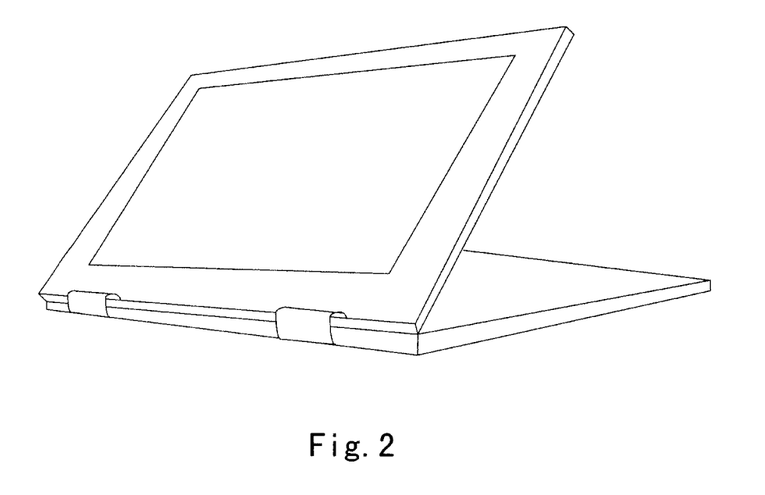
FIG. 2 is a structurally schematic view of an electronic device in an innovative notebook configuration in prior art.

Further, another notebook with conventional configuration is shown in FIG. 2. It has a technical problem that there is no further rotation for the display screen of this electronic device after the display screen is rotated by 180° relative to the keyboard.

Figure 3:
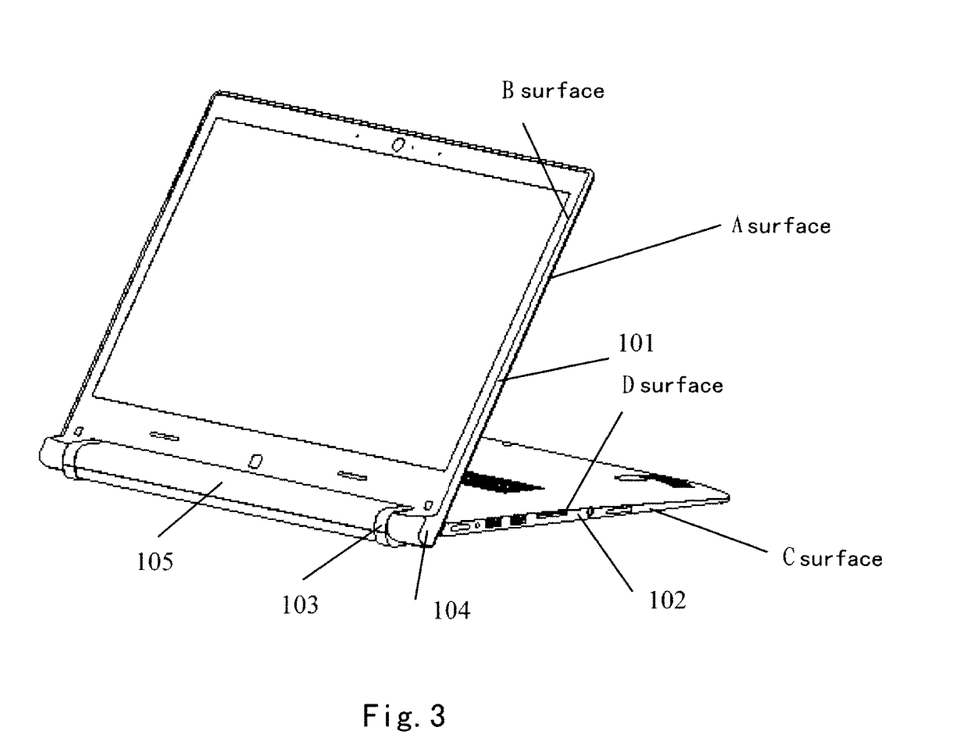
FIG. 3 is a structurally schematic view of an electronic device according to one embodiment of the present invention.

Furthermore, a notebook with innovational configuration is shown in FIG. 3. In a stand-up posture, there is a technical problem that angular position of the display screen in this electronic device changes along with the touch operation as torsion of the shaft in this notebook cannot bear against force applied by the user during the click operation.

In addition, in the stand-up posture, another technical problem is that keycaps on the electronic device may likely fall down.

SUMMARY OF THE INVENTION

The present invention has been made to solve at least one of these technical problems existing in the prior art.

An object of the invention is to provide an electronic device aiming to solve the technical problem existing in the art that angular position of the display screen in the conventional electronic device changes along with the touch operation as torsion of the shaft in the conventional electronic device cannot bear against force applied by user during the click operation. The electronic device according to the present invention has the technical effect that a first body having a display screen thereon is rotatable relative to a second body having a keyboard thereon till a first posture where the electronic device is held in a stable condition regarding the angle position when user performs a touch operation on the display screen.

In accordance with an embodiment of the present invention, there provides an electronic device comprising, a first body including an A surface and a B surface that are opposite to each other;

a second body including a C surface and a D surface that are opposite to each other; and a connecting piece by means of which the first and the second bodies are connected and the first body is rotatable relative to the second body;

wherein a further rotation of the first body around the connecting piece is prevented by the second body when the first body is rotated relative to the second body, by means of the connecting piece, such that the electronic device is at a first posture that is a relative positional posture where value of an angle between the A surface and the D surface is a first angle value within a first range of greater than 0° but less than or equal to 90°.

In an alternative embodiment, the connecting piece is provided on a first end surface, that is intersected with the C surface, of the second body, and, the connecting piece is exposed relative to the first end surface such that, by means of the connecting piece, the first body is rotatable from an angle value of 0° to a second angle value, relative to the second body, wherein a sum of the first angle value and the second angle value is 360°.

In an alternative embodiment, value of an angle between the first end surface and the C surface is a third angle value within the first range.

In an alternative embodiment, the first body is stably supported by the second body by means of the first end surface when the electronic device is at the first posture.

In an alternative embodiment, the first body is stably supported by the second body by means of an intersection line between the first end surface and the C surface when the electronic device is at the first posture.

In an alternative embodiment, the first body is stably supported by the second body by means of an intersection line between the first end surface and the D surface when the electronic device is at the first posture.

Further, the electronic device may comprise a supporting pad provided on the D surface of the second body; wherein the first body is stably supported by the second body by means of the supporting pad and the first end surface of the second body when the electronic device is at the first posture.

In an alternative embodiment, the first body has a protrusion part; and, when the electronic device is at the first posture, the protrusion part is in contact with a surface where said electronic device is to be placed such that the C surface is not in contact with the surface.

In an alternative embodiment, when the first body is rotated relative to the second body, every circle that is formed by every point on the protrusion part around center for the circle at the center of the connecting piece is not intersected with the first end surface such that rotation of the first body is not obstructed by the protrusion part.

Compared with the prior arts, one or more technical solution(s) according to these embodiments of the present invention at least has following technical benefits and advantages.

In the embodiments of the present invention, the first body is connected to the second body by the connecting piece. A further rotation of the first body around the connecting piece is prevented by the second body when the first body is rotated relative to the second body, by means of the connecting piece, such that the electronic device is at a first posture that is a relative positional posture where value of an angle between the A surface and the D surface is a first angle value within a first range of greater than 0° but less than or equal to 90°. With this configuration, the technical problem that there is no rotation allowable for the display screen of this electronic device after the display screen is rotated by 180° relative to the keyboard is solved.

Further, the technical problem existing in the prior art that angular position of the display screen in the electronic device changes along with the touch operation as torsion of the shaft in the notebook cannot bear against force applied by the user during the user's click operation is solved. Moreover, the first body having a display screen thereon of the electronic device is rotatable relative to a second body having a keyboard thereon till a first posture where further rotation of the first body is obstructed by the second body and the electronic device is held in a stable condition regarding the angle position when user performs a touch operation on the display screen.

Still further, there is provided a protrusion part on the first body, and, when the electronic device is at the first posture, the protrusion part is in contact with a surface where said electronic device is to be placed such that the C surface is not in contact with the surface. That is, the technical problem existing in the prior art that keycaps on the electronic device may likely fall down in the stand-up posture as the keyboard is close to the placement table is solved. Accordingly, it achieves the technical effect that the input unit is prohibited to be in contact with the placement table.

BRIEF DESCRIPTION OF THE DRAWINGS

These and/or other aspects and advantages of the invention will become apparent and more readily appreciated from the following description of the embodiments, taken in conjunction with the accompanying drawings of which.

The scope of the present invention will in no way be limited to the simply schematic views of the drawings, the number of constituting components, the materials thereof, the shapes thereof, the relative arrangement thereof, etc., and are disclosed simply as an example of an embodiment.

DETAILED DESCRIPTION OF PREFERRED EMBODIMENTS OF THE INVENTION

Certain embodiments of the present invention will be described hereinafter in detail with reference to the attached drawings, wherein the like reference numerals refer to the like elements. The present invention may, however, be embodied in many different forms and should not be construed as being limited to the embodiment set forth herein; rather, these embodiments are provided so that the present invention will be thorough and complete, and will fully convey the concept of the invention to those skilled in the art.

In accordance with an embodiment of the present invention, there is provided an electronic device aiming to solve the technical problem existing in the art that angular position of the display screen in the conventional electronic device changes along with the touch operation as torsion of the shaft in the conventional electronic device cannot bear against force applied by the user during the user's click operation. The electronic device according to the present invention has the technical effect that a first body having a display screen thereon is rotatable relative to a second body having a keyboard thereon till a first posture where the electronic device is held in a stable condition regarding the angle position when user performs a touch operation on the display screen.

In order to solve the above technical problem, the technical solution according to these embodiments of the present invention has the general inventive concept as follows.

An electronic device comprises a first body including an A surface and a B surface that are opposite to each other; a second body including a C surface and a D surface that are opposite to each other; and a connecting piece by means of which the first and the second bodies are connected and the first body is rotatable relative to the second body; wherein a further rotation of the first body around the connecting piece is prevented by the second body when the first body is rotated relative to the second body, by means of the connecting piece, such that the electronic device is at a first posture that is a relative positional posture where value of an angle between the A surface and the D surface is a first angle value within a first range of greater than 0° but less than or equal to 90°. With this configuration, the technical problem existing in the prior art that angular position of the display screen in the electronic device changes along with the touch operation as torsion of the shaft in the notebook cannot bear against force applied by the user during the user's click operation is solved, and the first body having a display screen thereon of the electronic device is rotatable relative to a second body having a keyboard thereon till a first posture where further rotation of the first body is obstructed by the second body and the electronic device is held in a stable condition regarding the angle position when user performs a touch operation on the display screen.

In order to get a better understanding on the above-mentioned technical solution, the present invention provides the following description of the embodiments in detail, taken in conjunction with the accompanying drawings.

According to an embodiment of the present invention, as shown in FIG. 3, there is provided an electronic device comprising a first body 101 including an A surface and a B surface that are opposite to each other.

During the implementation process, the first body has a first touch display unit on the B surface thereof. In particular, the first touch display unit may be a capacitive touch screen, or a resistive touch screen. On the first touch display unit, user can not only obtain video information but also perform the touch operation. In the case that the first touch display unit is a capacitive touch screen, when the screen is touched by user's finger, the capacitance at the touched site in the screen changes, and accordingly, the frequency of the related oscillator changes. In this way, by measuring change of the frequency, the touched site can be determined by the electronic device. In the case that the first touch display unit is a resistive touch screen, when the screen is touched by user's finger, indium-tin oxide (ITO) in the lower thin film of the screen is brought to be in contact with the ITO in the upper thin film of the glass, a corresponding electronic signal is sent out from a sensor and is transmitted via a transformation circuit to a processor and then is processed by the processor such that the touched site can be determined. In the first body, a surface which is opposite to the B surface is the A surface, generally an outer appearance surface.

According to an embodiment of the present invention, the electronic device further comprises a second body 102 including a C surface and a D surface that are opposite to each other.

During the implementation process, the second body has an input unit on the C surface thereof. In particular, the input unit may be a physical keyboard, or a touch panel, or a second touch display unit, and, the second touch display unit can be as the same type as or be different type from the first touch display unit. For example, both the first touch display unit and the second touch display unit are capacitive touch screens. Alternatively, the first touch display unit is a capacitive touch screen but the second touch display unit is a resistive touch screen. In the case that the input unit is the second touch display unit, the electronic device possesses a double screen mode. The second touch display unit, and the first touch display unit in the B surface of the first body can output the video information simultaneously. In addition, under a normal input mode, the second touch display unit may present a virtual keyboard for user to perform the input by touch. It should be noted that, two or more abovementioned input units, or any appropriate input units, can be provided on the C surface of the second body. The present invention is not intended to be limited to the above specific embodiments. In the second body, a surface which is opposite to the C surface is the D surface, generally a bottom surface of the electronic device, and, there is provided a perforation structure in the bottom surface, for heat dissipation of the electronic device.

According to an embodiment of the present invention, the electronic device further comprises a connecting piece 103 by means of which the first body 101 and the second body 102 are connected and the first body 101 is rotatable relative to the second body 102.

Figure 4:
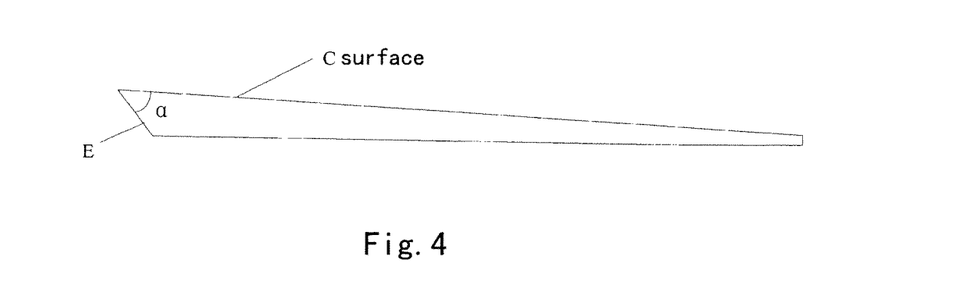
FIG. 4 is a schematic view showing an angle α between the first end surface E and the C surface in the second body 102 according to one embodiment of the present invention.

In a specific embodiment, the connecting piece 103 is provided on a first end surface E of the second body 102, and, the connecting piece 103 is exposed relative to the first end surface E. As shown in FIG. 4, the first end surface E is intersected with the C surface. There is an angle of a between the first end surface E and the C surface, and this angle α has a value of a third angle value. Specifically, the connecting piece 103 includes a first and a second part having the same structure. The first part and the second part are disposed at both sides of the first end surface, respectively, away from both sides of the first end surface by a predetermined distance range. Those skilled in the art may achieve the predetermined distance range in accordance with actual size of the electronic device. In particular, the connecting piece 103 may be a rotating shaft, or a sleeve with a hole structure. In the case that the connecting piece 103 is a rotating shaft, the first body 101 thereon has a sleeve, which corresponds to the rotating shaft. By means of connection between the rotating shaft and the sleeve, connection between the first body 101 and the second body 102 is achieved and the first body 101 is rotatable relative to the second body 102. Similarly, in the case that the connecting piece 103 is a sleeve, the first body 101 has a rotating shaft thereon, which corresponds to the sleeve. Moreover, the sleeve has a profile of rectangular shape or circular shape. Those skilled in the art can appreciate that the connecting piece can be of any other shape, and the present invention is not limited to this. In addition, the connecting piece 103 can be integrated into the first end surface E of the second body 102 during manufacturing of the second body 102.

According to an embodiment of the present invention, a further rotation of the first body 101 around the connecting piece 103 is prevented by the second body 102 when the first body 101 is rotated relative to the second body 102, by means of the connecting piece 103, such that the electronic device is at a first posture. The first posture is a relative positional posture where value of an angle β between the A surface and the D surface is a first angle value within a first range of greater than 0° but less than or equal to 90°, that is, 0°<β≤90°. In addition, the third angle value is within the first range, that is, 0°<α≤90°.

Figure 5:
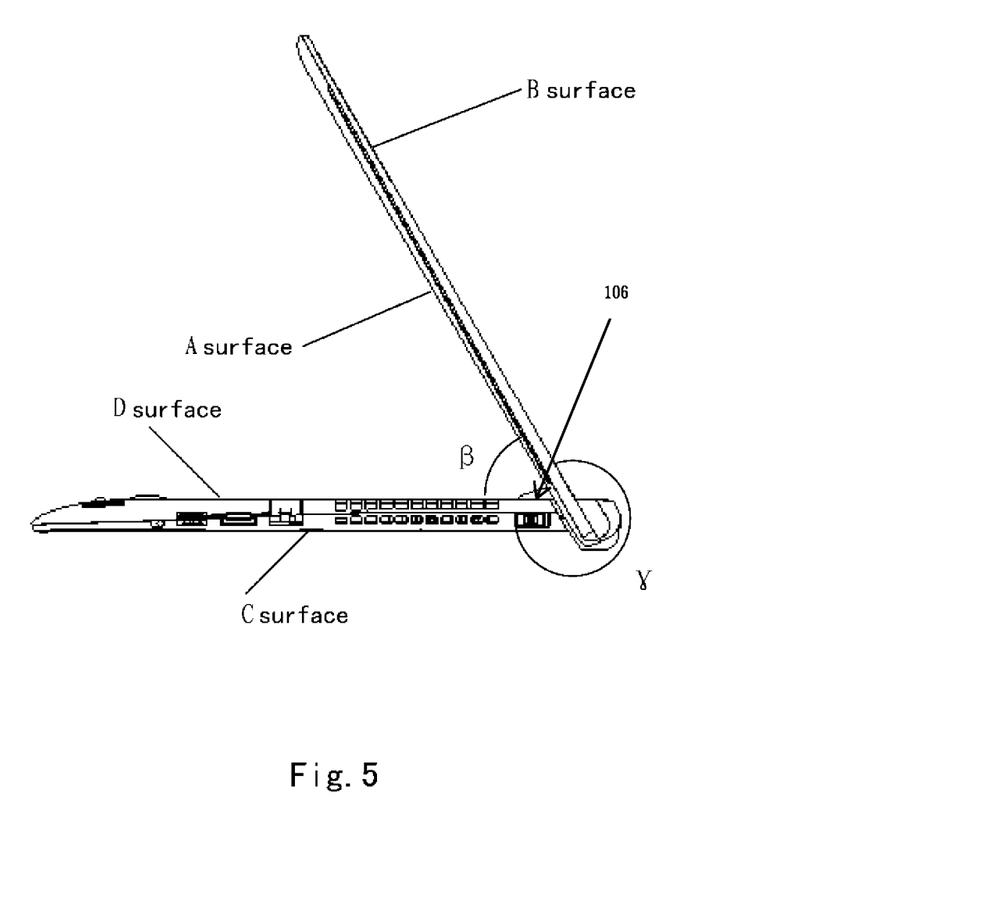
FIG. 5 is a side view of an electronic device according to one embodiment of the present invention.

In FIG. 5 which is a side view of the electronic device according to one embodiment of the present invention, the first body 101 is rotatable by means of the connecting piece 103 from an angle value of 0° to a second angle value that is a value of the angle γ between the B surface of the first body and the C surface of the second body. A sum of the first angle value and the second angle value is 360°, that is, β+γ=360°. Accordingly, the angle γ is within the range of 270°≤γ<360°. For example, after the first body 101 is rotated from 0° to 180° relative to the second body 102, once the angle γ is rotated to an angle value of 300°, then the angle β has an angle value of 60°; and, once the angle γ is rotated to an angle value of 320°, then the angle β has an angle value of 40°.

In accordance with embodiments of the present invention, at the first posture, three positional relationships among the first body 101, the second body 102 and the first end surface E of the second body 102 as follow can be achieved.

First Relationship

Figure 6:
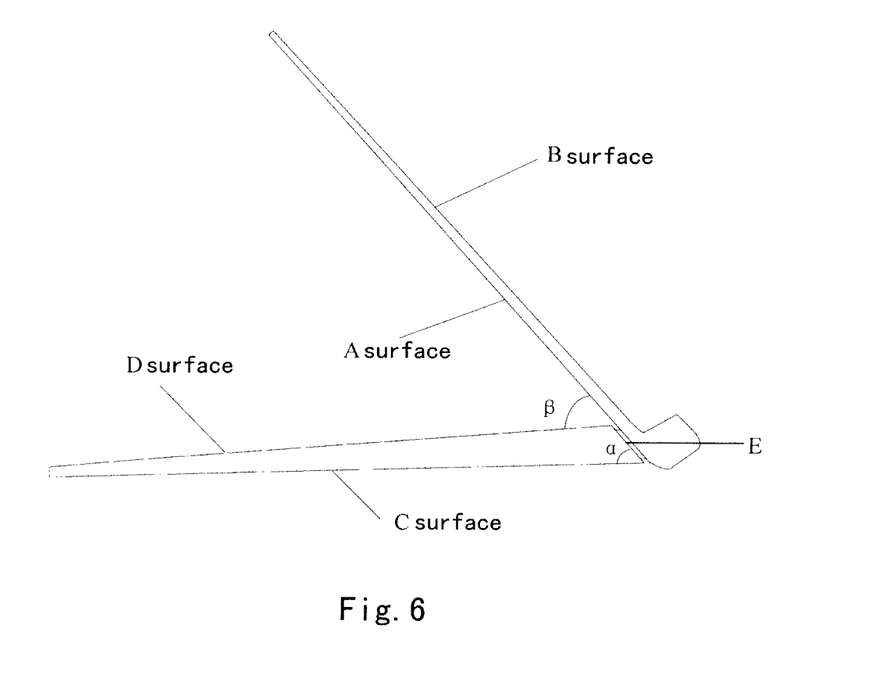
FIG. 6 is a schematic view showing a first positional relationship among the first body 101, the second body 102 and the first end surface E according to one embodiment of the present invention.

As shown in FIG. 6, the first body 101 is stably supported by the second body 102 by means of the first end surface E, and the first end surface E is parallel with the A surface. If the C surface and the D surface of the second body 102 are parallel with each other, then angle value of angle β equals to that of angle α, that is, the first angle value equals to the third angle value.

Second Relationship

Figure 7:
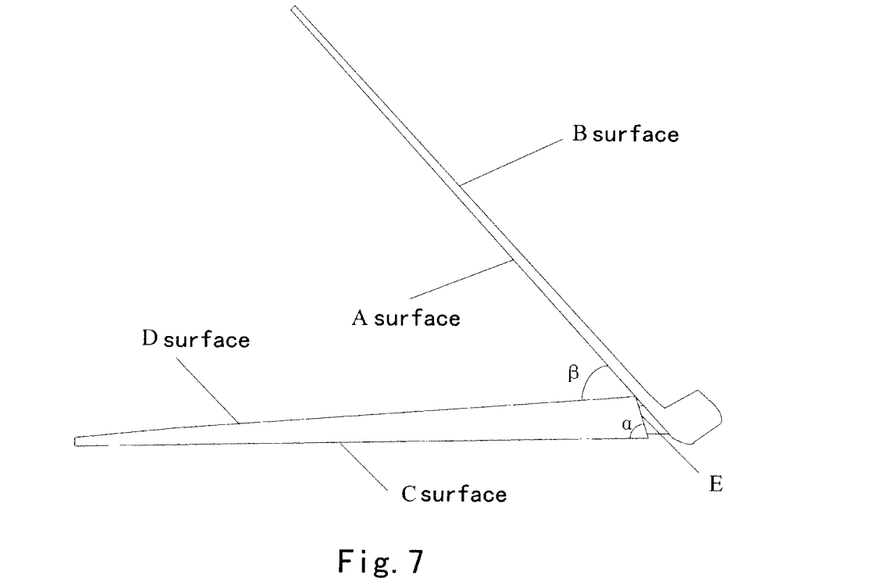
FIG. 7 is a schematic view showing a second positional relationship among the first body 101, the second body 102 and the first end surface E according to one embodiment of the present invention.

As shown in FIG. 7, the first body 101 is stably supported by the second body 102 by means of an intersection line between the first end surface E and the D surface. If the C surface and the D surface of the second body 102 are parallel with each other, then angle value of angle β is greater than that of angle α, that is, the first angle value is greater than the third angle value.

Third Relationship

Figure 8:
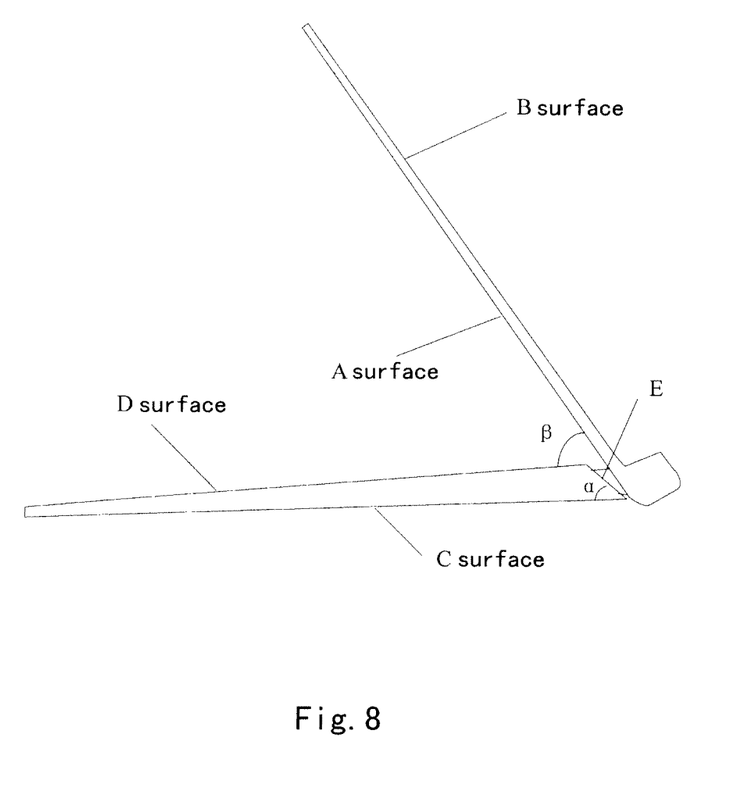
FIG. 8 is a schematic view showing a third positional relationship among the first body 101, the second body 102 and the first end surface E according to one embodiment of the present invention.

As shown in FIG. 8, the first body 101 is stably supported by the second body 102 by means of an intersection line between the first end surface and the C surface. If the C surface and the D surface of the second body 102 are parallel with each other, then angle value of angle β is less than that of angle α, that is, the first angle value is less than the third angle value.

According to an embodiment of the present invention, the electronic device further comprises a supporting pad 106 provided on the D surface of the second body. The first body is stably supported by the second body by means of the supporting pad 106 and the first end surface of the second body when the electronic device is at the first posture. Specifically, the supporting pad 106 is made of materials such as ordinary rubber or damping rubber. Preferably, the supporting pad 106 is made of damping rubber as the damping rubber has a higher damping coefficient, of 0.4~-0.7 possibly, than the ordinary rubber, as well as be less affected by temperature. Accordingly, the electronic device is stably supported at the first posture by means of the damping rubber in the D surface and the first end surface E of the second body.

According to an embodiment of the present invention, the first body 101 has a protrusion part 104. When the electronic device is at the first posture, the protrusion part 104 is in contact with a surface where said electronic device is to be placed such that the C surface is not in contact with the surface. In addition, the first body 101 is connected to the connecting piece 103 by means of the protrusion part 104. Specifically, the protrusion part 104 is the abovementioned sleeve or rotating shaft.

Concerning the above, contact of the input unit of the second body 102 to the surface where said electronic device is to be placed is avoided by allowing the protrusions part 104 to be in contact with the surface in order to support the electronic device. This proves to protect the input unit.

According to an embodiment of the present invention, when the first body 101 is rotated relative to the second body 102, every circle that is formed by every point on the protrusion part 104 around center for the circle at the center of the connecting piece 103 is not intersected with the first end surface E such that rotation of the first body 101 is not obstructed by the protrusion part 104. In practical application, in order to ensure that the first body 101 is normally rotated around the second body 102 by means of the rotating shaft structure, it requires a predetermined safety distance between the first body 101 and the second body 102. Different safety distance may be set in accordance to various practical requirements. Generally, the safety distance is in the range of 1 mm-2 mm.

According to an embodiment of the present invention, the electronic device further comprises a battery unit 105 for power supply in case that there is no power supply to the electronic device. As shown in FIG. 3, if required, the battery unit 105 will be brought to be connected onto the second body 102.

The electronic device according to these embodiments is intended to be used in the information processing method according to embodiments of the present invention. Based on the information processing method according to embodiments of the present invention, those skilled in the art may easily appreciate these embodiments of the electronic device and various changes or modifications of this electronic device. Accordingly, no more detailed disclosure on the electronic device will be given. All these electronic devices used in the information processing method according to embodiments of the present invention fall into the scope of the present invention.

Compared with the prior art, one or more technical solution(s) according to these embodiments of the present invention at least has following technical benefits and advantages.

In the embodiments of the present invention, the first body is connected to the second body by the connecting piece. A further rotation of the first body around the connecting piece is prevented by the second body when the first body is rotated relative to the second body, by means of the connecting piece, such that the electronic device is at a first posture that is a relative positional posture where value of an angle between the A surface and the D surface is a first angle value within a first range of greater than 0° but less than or equal to 90°. With this construction, the technical problem that there is no further rotation for the display screen of this electronic device after the display screen is rotated by 180° relative to the keyboard is solved.

Further, the technical problem existing in the prior art that angular position of the display screen in the electronic device changes along with the touch operation as torsion of the shaft in the notebook cannot bear against force applied by the user during the user's click operation is solved, and the first body having a display screen thereon of the electronic device is rotatable relative to a second body having a keyboard thereon till a first posture where further rotation of the first body is obstructed by the second body and the electronic device is held in a stable condition regarding the angle position when user performs a touch operation on the display screen.

Furthermore, there is provided a protrusion part on the first body, and, when the electronic device is at the first posture, the protrusion part is in contact with a surface where said electronic device is to be placed such that the C surface is not in contact with the surface. That is, the technical problem existing in the prior art that keycaps on the electronic device may likely fall down in the stand-up posture as the keyboard is close to the placement table is solved. Accordingly, it achieves the technical effect that the input unit is prohibited to be in contact with the placement table.

It should be appreciated that various changes or modifications may be made in the present invention without departing from the principles and spirit of the invention. The present invention intends to cover these changes or modifications once these changes or modifications fall into the principles and spirit of the disclosure, the scope of which is defined in the claims and their equivalents.

What is claimed is:

1. An electronic device comprising,
   a first body including an A surface, which is planar in whole, and a B surface that are opposite to each other;
   a second body including a C surface and a D surface that are opposite to each other; and
   a connecting piece by means of which said first and said second bodies are connected and said first body is rotatable relative to said second body;
   wherein, the first body further includes a pair of protrusion parts provided respectively at both ends of the connecting piece;
   wherein a further rotation of said first body around said connecting piece is prevented by said second body, through a direct contact between a first end surface, that is intersected with said C surface, of the second body and the A surface of the first body, when said first body is rotated relative to said second body, by means of said connecting piece, such that said electronic device is at a first posture that is a relative positional posture where value of an angle between said A surface and said D surface is a first angle value within a first range of greater than 0° but less than or equal to 90°;

wherein the connecting piece is configured to be movable linearly relative to the second body such that, said first body is stably supported by said second body in three conditions as follows: 1) by means of abutting said A surface against said first end surface, and 2) by means of abutting said A surface against an intersection line between said first end surface and said D surface, and 3) by means of an intersection line between said first end surface and said C surface, when said electronic device is at said first posture.

2. The electronic device according to claim 1, wherein said connecting piece is provided on the first end surface of said second body, and, said connecting piece is exposed relative to said first end surface such that, by means of said connecting piece, said first body is rotatable from an angle value of 0° to a second angle value, relative to said second body, wherein a sum of said first angle value and said second angle value is 360°.

3. The electronic device according to claim 2, wherein a value of an angle between said first end surface and said C surface is a third angle value within said first range.

4. The electronic device according to claim 3, further comprising,
 a supporting pad provided on said D surface of said second body;
 wherein said first body is stably supported by said second body by means of said supporting pad and said first end surface of said second body when said electronic device is at said first posture.

5. The electronic device according to claim 1, wherein, when said electronic device is at said first posture, said pair of protrusion parts are in contact with a surface where said electronic device is to be placed such that said C surface is not in contact with the surface where said electronic device is to be placed.

6. The electronic device according to claim 5, wherein, during rotation of said first body relative to said second body, said pair of protrusion parts rotate around a center of said connecting piece and are not in direct physical contact with said first end surface such that rotation of said first body is not obstructed by the pair of protrusion parts.

* * * * *